US005861837A

United States Patent [19]
Richardson et al.

[11] Patent Number: 5,861,837
[45] Date of Patent: Jan. 19, 1999

[54] POLY-FREQUENCY CW DOPPLER RADAR SYSTEM WITH LEAKAGE CANCELLATION AND METHOD

[75] Inventors: David L. Richardson, Arlington Heights; Thomas E. Szmurlo, Palatine, both of Ill.

[73] Assignee: Northrop Grumman Corporation, Los Angeles, Calif.

[21] Appl. No.: 820,618

[22] Filed: Mar. 19, 1997

[51] Int. Cl.$^6$ ................................................. G01S 7/285
[52] U.S. Cl. .......................... 342/198; 342/93; 342/159
[58] Field of Search ................................. 342/198, 159, 342/39, 93, 195, 378, 379

[56] References Cited

U.S. PATENT DOCUMENTS

| | | | |
|---|---|---|---|
| 3,576,564 | 4/1971 | Galvin | 342/89 |
| 3,611,370 | 10/1971 | Frasure et al. | 342/82 |
| 3,617,993 | 11/1971 | Massie et al. | 342/104 X |
| 3,670,327 | 6/1972 | Clare et al. | 342/120 |
| 3,703,004 | 11/1972 | Slater | 342/194 |
| 3,750,171 | 7/1973 | Faris | 342/112 |
| 3,860,925 | 1/1975 | Darboven, Jr. | 342/109 |
| 3,978,483 | 8/1976 | Lewis et al. | 343/100 LE |
| 4,044,357 | 8/1977 | Goldie | 343/17.5 |
| 4,079,381 | 3/1978 | Plasinger | 343/100 SA |
| 4,219,812 | 8/1980 | Rittenbach | 342/110 |
| 4,268,828 | 5/1981 | Cribbs et al. | 342/26 |
| 4,328,495 | 5/1982 | Thue | 342/109 |
| 4,439,769 | 3/1984 | Masak | 343/380 |
| 4,439,770 | 3/1984 | Lewis et al. | 343/381 |
| 4,584,583 | 4/1986 | Dennis, Jr. et al. | 343/380 |
| 4,689,628 | 8/1987 | Lewis | 342/384 |
| 4,725,842 | 2/1988 | Mayberry | 342/198 |
| 4,806,935 | 2/1989 | Fosket et al. | 342/120 |
| 5,337,052 | 8/1994 | Lohrmann et al. | 342/68 |

OTHER PUBLICATIONS

William A. Penn et al, "Optical adaptive multipath canceller for surveillance radar", Optoelctronic Signal Processing for Phased–Array Antennas II (1990), pp. 151–160, 1990.

Robert D. Short, "An Adaptive MTI for Weather Clutter Suppression", IEEE Trans. A&E Syst., vol.AES–18, No. 5, Sep. 1982.

P. Benvenuti et al, "Improvement Factor Evaluatioon of Open Loop Adaptive Digital MTI", IEEE Int'l Radar conf., IEEE Pub. 75 CHO 938–1 AES, pp. 52–56, Apr. 1975.

G.G. Raleigh et al, "Design of a Miniature Solid State Feedthru Nuller", IEEE MTT–S Digest, pp. 965–968, 1990.

Ashok K. Gupta, "Window selection for specified 3–D spectral leakage in multichannel detection systems", IEEE, pp. 0122–0126, 1991.

*Primary Examiner*—John B. Sotomayor
*Attorney, Agent, or Firm*—Terry J. Anderson; Karl J. Hoch, Jr.

[57] ABSTRACT

A single antenna poly-frequency Continuous Wave (CW) Doppler radar system having leakage cancellation. The system provides for transmitting a plurality of carrier frequency signals and receiving the return signals by means of a single antenna coupled to an antenna interface through which a portion of the transmitted signal may leak. The signal appearing on an output port of the antenna interface is then down-converted to an intermediate frequency (IF) signal by a stable mixing signal. The IF signal is coupled to an adder which in turn is coupled to an output. The IF signal is further split into a pair of cancellation loops for each carrier frequency signal. Each cancellation loop includes a correlator and provides for processing the IF signal with an in-phase or a quadrature-phase signal associated with the carrier frequency signal so that each pair of cancellation loops outputs a feedback signal representative of and equal to the amplitude of the leakage signal only, which feedback signal then being subtracted from the IF signal with the resultant return signal less the leakage signal then being transmitted for further processing. Preferably, a second order linear feedback circuit and phase compensation circuit is provided in each cancellation loop for processing of the IF signal.

The disclosed system does not require high precision, high cost oscillators and has particular application in military radars, navigation radars and vehicular collision warning radars.

11 Claims, 4 Drawing Sheets

POLY-FREQUENCY CW DOPPLER RADAR SYSTEM WITH LEAKAGE CANCELLATION AND METHOD

BACKGROUND OF THE INVENTION

1. Field of the Invention

The present invention relates generally to the field of radar systems and more particularly, but not by way of limitation, to an improved continuous wave (CW) Doppler radar system with leakage cancellation.

2. Prior Art

CW Doppler radar systems offer a number advantages over pulse radar systems. Even so, CW Doppler radar systems have always suffered from a disadvantage of feed-through or leakage signals in the receiver. The leakage signal is usually several orders of magnitude larger than the received signal and tends to hide the received signal. The leakage signal is created because of imperfect isolation between the transmit and receive paths of a CW Doppler radar system and as well as scattering from nearby objects. In *The Electrical Engineering Handbook* published by the CRC PRESS in 1993, Section 39.2 relating to Continuous Wave Radar noted that the largest disadvantage for CW radars is the need to provide antenna insolation (reduce spillover) so that the transmitted signal does not interfere with the receiver. A second disadvantage noted was the existence of noise sidebands on the transmitter signal which reduce sensitivity because the Doppler frequencies are relatively close to the carrier signal.

One solution has been to separate the receive antenna from the transmit antenna. This provides better isolation between the transmit and receive paths. However, even relatively small side lobes in the transmit and receive antennas will result in coupling that allows leakage signals to occur.

An example of this solution is U.S. Pat. No. 3,978,483 issued on Aug. 31, 1976 to Bernard L. Lewis et al and which is discloses adaptive canceler loops that receive inputs from an auxiliary channel signal and operate on a main channel signal to reduce interference in the main channel signal. The auxiliary channel signal is supplied through a quadrature hybrid circuit to provide I and Q components to the adaptive loops, which loops are connected in series and cascaded such as to form a plurality of serially connected I and Q loops.

Another solution has been to use an auxiliary antenna to also receive the return signal. By subtracting the signal received by the primary receive antenna from the signal received by the auxiliary receive antenna, the leakage signal is left. This leakage signal is subtracted from the return signal in the primary antenna, thus reducing the leakage signal. However, this system requires at least two antennas and makes the system bulky and expensive. Examples of prior art patents that disclose the use of a plurality of auxiliary receiving antennas are U.S. Pat. Nos. 4,439,770 and 4,689,628. U. S. Pat. No. 4,439,770 issued on Mar. 27, 1984 to Bernard L. Lewis et al for CASCADED ADAPTIVE LOOPS and discloses a sidelobe-canceler system for canceling jamming interference signals from a radar signal that includes serially cascaded cancellation channels utilizing preprocessing cancelers and main-channel cancelers. U.S. Pat. No. 4,689,628 issued on Aug. 25, 1987 to Bernard L. Lewis for ADAPTIVE SIDELOBE CANCELER SYSTEM discloses the use of a plurality of auxiliary antennas that receive interference from a plurality of sources and provide independent inputs to a configuration of adaptive canceler loops. In a canceler system each of the independent loop outputs are then used as an input to a canceler loop in the main channel to cancel interference in the receiving system.

A single antenna system having provision for leakage cancellation is discussed in "Some Advances in CW Radar Techniques" by J. D. Harmer and W. S. O'Hare, IRE 5th MIL-E-CON Record, 1961, pages 311–323. This paper discusses an intermediate frequency (IF) feedback circuit that cancels the leakage signal. However, this circuit only works for a single frequency CW radar system. In addition, the circuit requires several high precision oscillators and these oscillators must constantly be calibrated to each other. Failure to continually calibrate the circuit can result in accidentally canceling the desired signal.

Thus, a need exists for a poly-frequency CW Doppler radar system having provision for leakage cancellation that does not require high precision, high cost oscillators and that operates with a single antenna for transmitting and receiving radar signals and with multiple carrier frequency signals.

SUMMARY OF THE INVENTION

The foregoing problems are overcome and other advantages are provided by a new and improved poly-frequency CW Doppler radar system having leakage cancellation which has particular application in military radars, navigation radars, and vehicular collision warning radars.

Briefly stated, the present invention contemplates a radar system with leakage cancellation that provides an antenna interface having an input that receives a plurality of carrier frequency signals. The antenna interface is coupled to a single antenna through an antenna interface port for transmitting and receiving signals. The received signal, which is comprised of the desired signal and any leakage signal from the transmitter, is down-converted to an intermediate frequency (IF). An adder is coupled to the Receive IF. The adder has an output coupled to an input of each of a plurality of cancellation loops for generating cancellation signals based on the level of leakage signals and in coherence with the transmitted signal. The output of each of the plurality of cancellation loops is coupled to a negative input of the adder to cancel the leakage signals present. Preferably, each cancellation loop includes a second order linear feedback circuit.

The system of the invention provides a method of canceling leakage in a radar system generally characterized by the steps of transmitting a plurality of carrier frequency signals; receiving return signals; down-converting the return signals as well as any leakage signals that may be present to form an IF signal; correlating the IF signal with a plurality of associated frequency signals to form a plurality of correlation signals; up-converting each of the plurality of correlation signals in accordance with the level of the leakage signals present to form a plurality of up-converted signals, summing the plurality of up-converted signals to form a feed-back signal, and subtracting the feed-back signal from the IF signal to remove the leakage signals.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiments may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompany drawings in which.

Similar numerals refer to similar parts in all FIGURES.

DETAILED DESCRIPTION OF THE INVENTION

Figure 1:
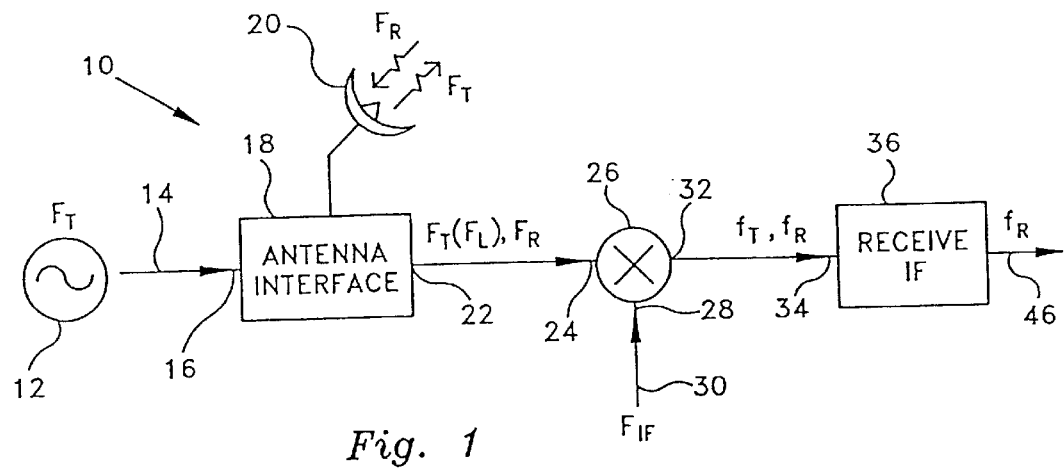
FIG. 1 is a simplified block diagram of a single antenna CW radar system having leakage cancellation that is constructed in accordance with one embodiment of the present invention.

Referring now to the drawings in detail and in particular to FIG. 1, reference character 10 generally designates a single antenna CW radar system with leakage cancellation that has been constructed in accordance with one embodiment of the present invention. The single antenna CW Doppler radar system 10 includes an oscillator 12 which creates a single frequency transmit signal $F_T$ on output 14 which is coupled to an input 16 of a suitable antenna interface arrangement 18. The antenna interface arrangement 18 creates the isolation between the signals transmitted and received by the radar system 10. A single antenna 20 coupled to the antenna interface arrangement 18 transmits the transmit signal $F_T$ and receives a return signal $F_R$. Since the antenna interface arrangement 18 does not provide complete isolation between the transmitted and received signals and due to scatter, the output 22 of the antenna interface arrangement 18 contains both the received Doppler signal $F_R$ and the transmit signal or leakage signal $F_T(F_L)$. The output 22 of the antenna interface arrangement 18 is coupled to an input 24 of an intermediate frequency (IF) mixer 26. A second input 28 of the IF mixer 26 receives an IF mix signal $F_{IF}$ on input 30 for down shifting the signals appearing on input 24. The IF mixer 26 has an output 32, on which appears the downshifted signals $f_T$ and $f_R$, that is coupled to an input 34 of a receive IF circuit which includes the cancellation circuit 36 of the present invention where the leakage signal $f_T$ can be canceled and the desired received signal $f_R$ appears on output 46 for further processing.

Figure 2:
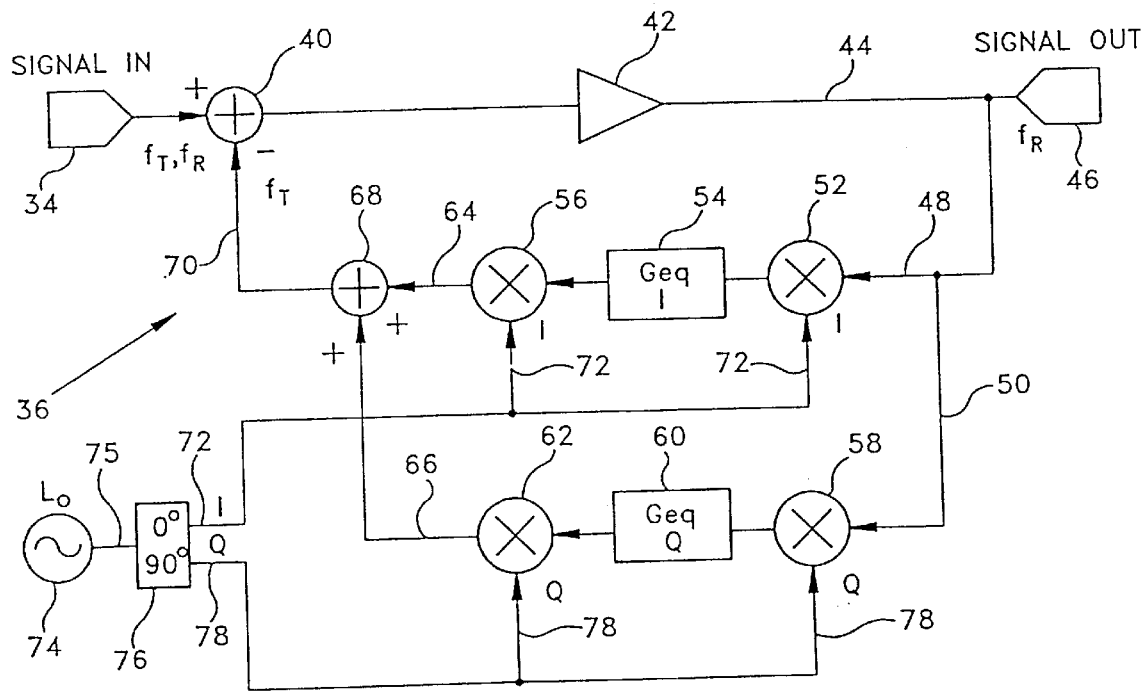
FIG. 2 is a simplified block diagram of the cancellation circuit of FIG. 1.

As seen in FIG. 2, the input 34 of the cancellation circuit 36 is coupled to a suitable signal adder 40 with a polarity inversion (or a subtractor). This component may typically be an analog operational amplifier, a transformer, or a 180 degree hybrid, depending on the performance requirements of the particular application. The output of the adder 40 is coupled to a suitable amplifier 42 having an output 44 that is coupled to an output port 46 of the cancellation circuit 36. The amplifier 42 is a buffer amplifier that isolates the output signal appearing on output 46 from the input signal on input 34 of the circuit 30. The amplifier 42 also provides gain for lowering the receive noise figure in a receiver application and increases the output signal for improving the dynamic range in the next stage.

The amplifier 42 has an output 44 that is split into an in-phase (I-phase) path 48 and a quadrature-phase (Q-phase) path 50. The I-phase path 48 has an I-phase mixer 52, an I-phase second order linear feedback circuit 54, designated Geq I, and an I-phase mixer 56.

Similarly the Q-phase path 50 includes a Q-phase mixer 58, a Q-phase second order linear feedback circuit 60, designated Geq Q, and a Q-phase mixer 68. The output 64 of the I-phase path 48 and the output 66 of the Q-phase path 50 are coupled to a second adder 68. The output 70 of the second adder 68 is coupled to a negative input of the first adder 40.

Figure 3:
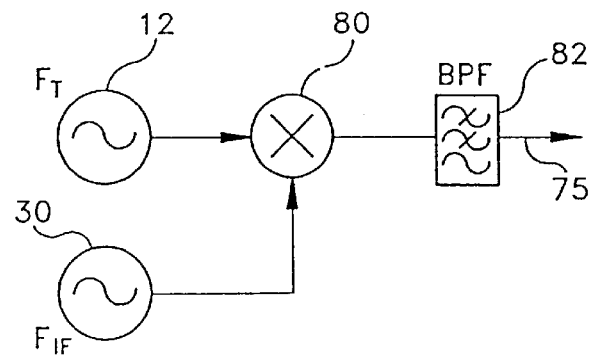
FIG. 3 is a simplified block diagram for generating the local oscillator signal that may used to advantage in the cancellation circuit of FIG. 1.

The I-phase mixer 52 and the I-phase mixer 56 have a common input 72. The common input 72 is the I-phase output of a local oscillator 74 coupled on input 75 to a suitable phase shifter 76. The Q-phase output 78 of the phase shifter 76 is the common input 78 of the Q-phase mixer 58 and the Q-phase correlation mixer 62. The frequency of the local oscillator 74 is the same as the transmit frequency $F_T$ so that the cancelling signal uses the local oscillator. The frequency of the local oscillator 74 is also used to generate the transmit frequency $F_T$, as shown in FIG. 3, so that the cancelling signal has the same frequency as the feedthru signal that was downconverted to the receive IF.

Figure 4:
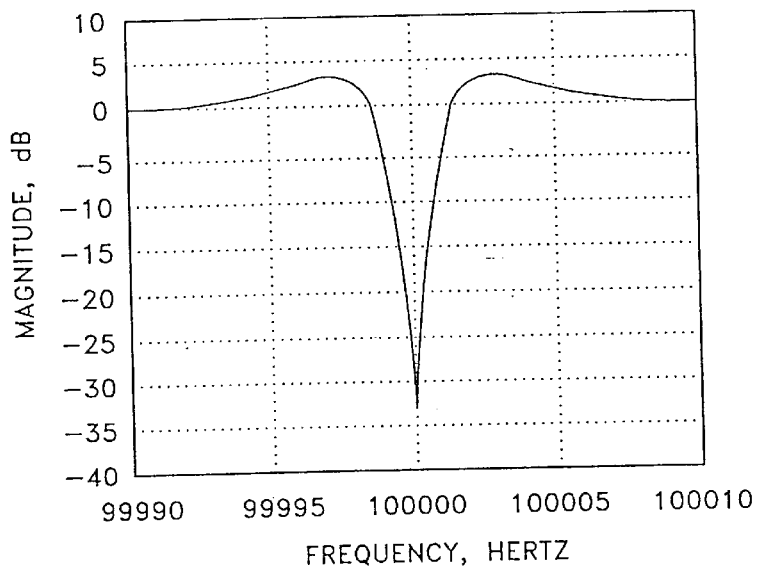
FIG. 4 is a chart which illustrates the output of the cancellation circuit of FIG. 1 for a particular set of conditions.

The standard formula for Geq of a second order linear feedback system such as employed in circuits 54 and 60 is:

$$Geq = \omega n^2/(s^2 + 2s\xi\omega n + \omega n^2)$$

where $\omega n$=natural frequency constant
  s=Laplace frequency variable
  $\xi$=damping factor constant The operation of the cancellation circuit 36 which will be discussed in detail hereinafter, provides a desirable cancellation or notch at a predetermined frequency, as seen in FIG. 4. The output of the circuit 36 is seen in FIG. 4 for the conditions $\omega n = 4\pi$, $\xi = \sqrt{2}$, center frequency=100 Khz, Geq= Geq I=Geq Q. As is seen in FIG. 4, the cancellation circuit 36 can, for the noted conditions, generate a notch bandwidth of less than 1 Hertz and a notch depth of over 40 dB. Thus, this circuit has an advantage of low distortion outside the notch band.

The purpose of the cancellation circuit 36 is to mix the IF signal appearing at the input 34 with the I and Q quadrature components 72 and 78 of the local oscillator signal 74 so that the leakage signal $f_T$ is down-shifted to a DC level indicative of its strength. The Geq circuits 54 and 60 are designed to pass only the low frequency signal $f_T$. The leakage signal level is then up-shifted by the mixers 56 and 62 back to the original IF frequency, the strength being in an amount proportional to the DC level. The up-shifted leakage cancellation signal $f_T$ is then subtracted from the IF signal appearing on input 34, namely $f_T + f_R$, thus leaving only the received signal $f_R$. The I and Q phase path 48 and 50 allow the cancellation circuit 36 to cancel out any phase the leakage signal may take. This circuit may require that the local oscillator signal LO generated by oscillator 74, the IF mix signal $F_{IF}$ appearing on lead 30 and the transmit signal $F_T$ be extremely stable and correctly tuned to produce a DC signal at the outputs of Geq circuits 54 and 60.

This requirement may be satisfied by using a highly stable oscillator as a reference frequency. When the IF mix signal $F_{IF}$ appearing on lead 30 is generated from a highly stable oscillator and used to generate the local oscillator signal in the manner shown in FIG. 3 the need for constant calibration is eliminated. In addition, only a single highly stable oscillator is required. As seen in FIG. 3, the transmit frequency $F_T$ generated by oscillator 12 is mixed with the IF mixer signal $F_{IF}$ in mixer 80 coupled to a suitable band pass filter 82 that passes the resultant signal to the input 75 of the phase shifter 76.

Figure 5:
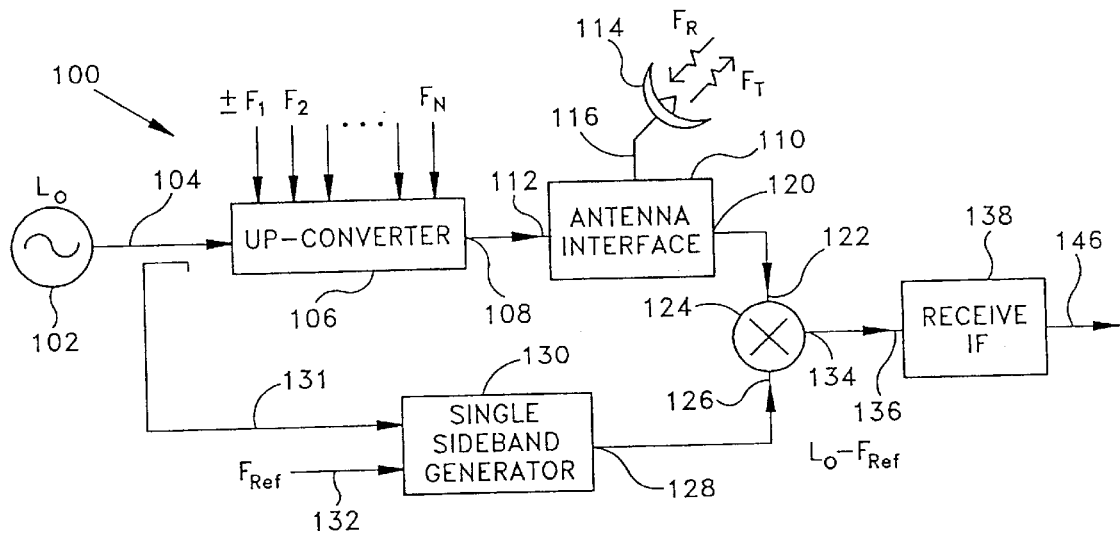
FIG. 5 is a simplified block diagram of an embodiment of a poly-frequency CW Doppler radar system with leakage cancellation constructed in accordance with the present invention.

Referring now to FIG. 5, another embodiment of the present invention is illustrated in the form of a polyfrequency CW Doppler radar system 100 which is also provided with a unique cancellation circuit. A local oscillator 102 generates a LO signal which is output on lead 104 to a suitable frequency up-converter 106 to form a plurality of transmitted output signals that are output on lead 108. The frequency up-converter 106 may be a double sideband modulator such as a mixer which receives signals $\pm F_1, F_2, \ldots, F_N$ and outputs transmitted output frequencies $LO \pm (F_1, F_2, \ldots F_N)$. A suitable antenna interface 110 has an input 112 for receiving the plurality of mixed carrier frequency signals. An antenna 114 is connected to an antenna port 116 of the antenna interface 110. The antenna 114 transmits the plurality of mixed carrier signals $F_T$ and receives a plurality of return signals $F_R$. The output of the antenna interface 110 appears on lead 120 and is coupled to a first input 122 of an intermediate frequency (IF) mixer 124. A second input 126 of the IF mixer 124 is connected to an output 128 of a single sideband (SSB) generator 130. The single sideband generator 130 combines the local oscillator signal LO, generated by the oscillator 102 and coupled to a input 131 of the SSB generator, with a highly stable reference frequency signal $F_{REF}$ to form a signal having a frequency equal to the difference between the local oscillator frequency LO and the reference frequency signal $F_{REF}$. Using the reference frequency signal $F_{REF}$ allows the other frequency sources to be less stable and eliminates the need for calibrating the radar systems's leakage (feed-through) cancellation circuit. The output 134 of the IF mixer 124 is coupled to the input 136 of the receive IF circuit 138 which represents the leakage cancellation circuit.

Basically, the cancellation circuit 138 is very similar to the cancellation circuit 36 of FIG. 2 which has been adapted to accommodate the addition or subtraction of a plurality of additional frequencies to or from the local oscillator frequency LO in order to provide multiple discrete frequencies to resolve range ambiguities, as is known to those skilled in the art. The input 136 of the cancellation circuit 138 is coupled to a suitable signal adder 140 with a polarity inversion (or a subtractor) in FIG. 6. The output of the adder 140 is coupled to a suitable amplifier having an output 144 that is coupled to an output port of the cancellation circuit 138. The amplifier has an output 144 that is initially split into two paths 150 and 152 which correspond, for example, as to whether a particular frequency $F_1$ has been added to or subtracted from the LO signal in the up-converter 106. While the cancellation circuit 138 of FIG. 6 is only directed to one particular frequency pair for illustrative purposes it is to be understood that the cancellation circuit 138 may contain 2N such loops according to the particular number N of discrete frequencies that are employed.

The path 150 is then split into an in-phase (I-phase) path 154 and a quadrature-phase (Q-phase) path 156. The I-phase path 154 includes an I-phase mixer 158, an I-phase second order linear feedback circuit Geq 160, an I-phase mixer 162. The I-phase path 150 also includes an adjustable phase compensation circuit 165 which receives an I-phase input 166 which is derived as will be seen in the discussion of FIG. 7 from the frequencies $F_{REF}$ and a chosen frequency $F_1$. The I-phase input 166 is also common to the mixer 162. The output of the mixer 162 is coupled to a second adder 164. The phase compensation block 165 represents a value that is the sum of the open loop time delays of the amplifier 142, the adders employed in the loop, the mixers 158 and 162, and the active devices used in making the Geq circuit 160, such as operation amplifiers.

Similarly, the Q-phase path 156 includes a Q-phase mixer 168, a Q-phase Geq circuit 170, a Q-phase mixer 172. The Q-phase path 156 also includes a phase compensation block 174 which is coupled to the Q-phase mixer 168 and that receives a Q-phase input signal that is also input to the Q-phase mixer 172 by means of input 176. The output of the Q-phase mixer 172 is coupled to an input of the second adder 164. The second adder 164 is in turn coupled to a third adder 178 that is coupled to a negative input of the first adder 140 for subtraction of the leakage signal $f_T$ from the signal $f_T, f_R$ as before.

Figure 7:
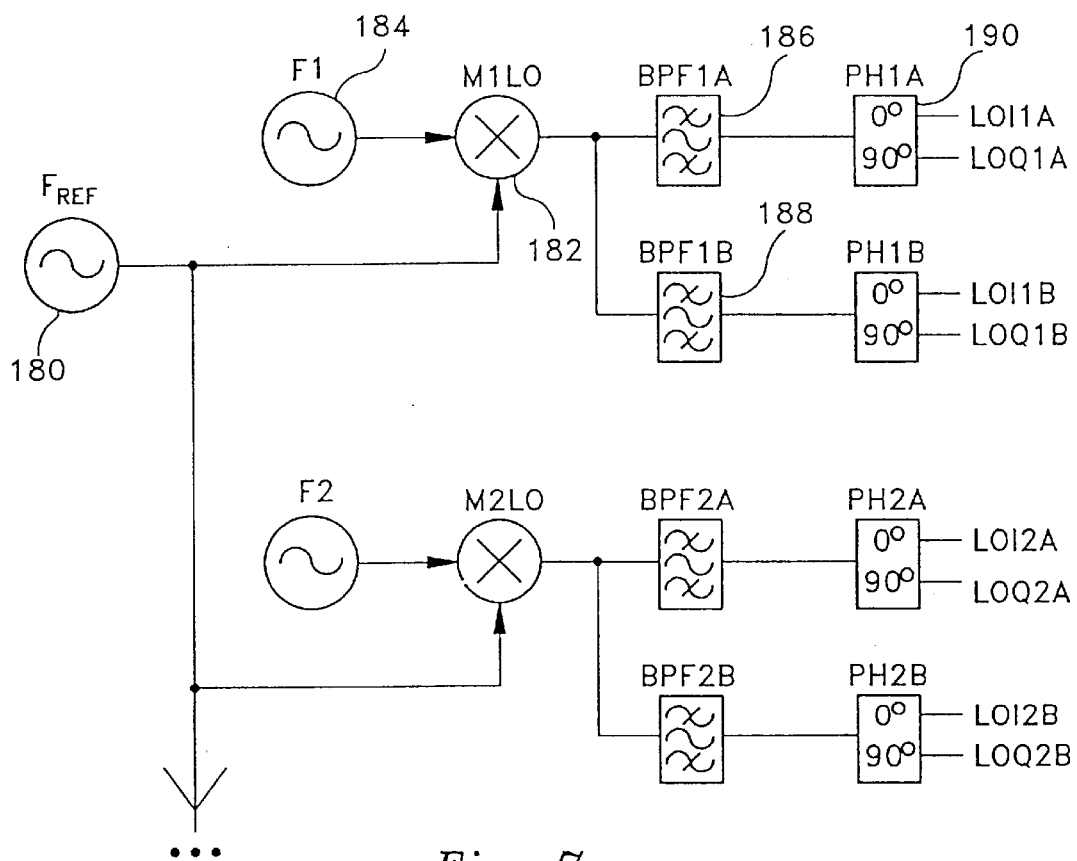
FIG. 7 is a simplified block diagram of a circuit used to generate the quadrature signals used in the cancellation circuit of FIG. 6.
Figure 6:
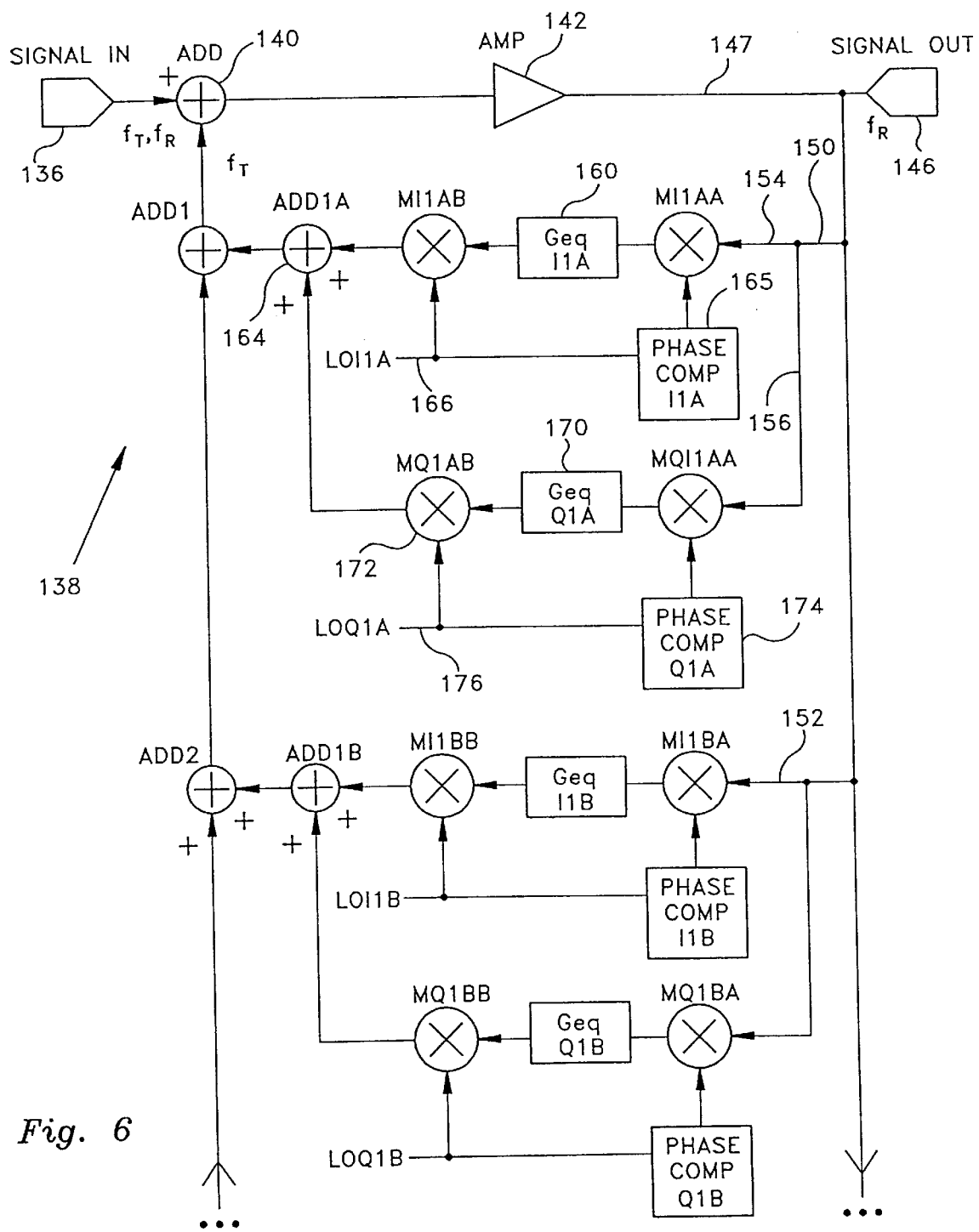
FIG. 6 is a simplified block diagram of a cancellation circuit used in the system of FIG. 5.

The path 152 will not be described in detail but it will be apparent from FIG. 6 that it represents the arrangement as path 150 with the paths differing only as to whether the frequency $F_1$ has been added or subtracted from the local oscillator frequency LO. As noted the arrangement of FIG. 6 may be extended to 2N frequencies by replicating the circuit N times and summing the outputs in the adders as shown. An optional bandpass filter can be inserted into the signal path at the input of the initial mixers to improve the dynamic signal handling of the loop. If the optional bandpass filter is used, then the phase compensation blocks would have to be adjusted accordingly, Referring now to FIG. 7, the arrangement for generating the LO sources for the canceler circuit 138 will be described in detail for frequency $F_1$, whether added or subtracted, from the local oscillator frequency LO with the understanding that the LO sources may be extended to 2N frequencies by replicating the circuit N times. A reference frequency source $F_{REF}$ is coupled to a mixer 182 which is coupled to a frequency source $F_1$ 184 as well. The output of the mixer 182 is coupled to the inputs of two bandpass filters 186 and 188. The bandpass filter 186 passes one sideband from the double sideband mixer 182 to a 90 degree splitter to create the quadrature signal for the first sideband. The second sideband from the mixer 182 is picked off by the bandpass filter 188 and passed to a 90 degree splitter to create the quadrature signals at that frequency. The LO sources are extended to 2N frequencies by replicating the circuit N times. As is seen in FIG. 7, the same arrangement is provided for quadrature signals for another frequency.

As seen in FIG. 4, the notch is coherent with the transmitted signal since the LO signals are shared by the receiver and transmitter. Thus, the cancellation circuit operates even when the exact frequencies are not known, and when LO and $F_1 \ldots F_N$ are drifting. It should be noted though that the cancellation circuit of the instant invention does require a stable reference signal $F_{REF}$ which may be provided by a crystal-controlled oscillator.

Thus, there has been described a radar system with leakage cancellation and a method that eliminates the need for several highly stable frequency sources. In addition, the invention does not require constant calibration between the highly stable frequency sources. It is also possible to cascade the cancellation circuits in the radar system to cancel multiple carrier frequency signals.

The present disclosure includes that contained in the appended claims as well as that of the foregoing description. Although this invention has been described in its preferred forms with a certain degree of particularity, it is understood that the present disclosure of the preferred from has been made only by way of example and numerous changes in the details of construction and combination and arrangement of parts and method steps may be resorted to without departing from the spirit and scope of the invention.

What is claimed is:

1. A Continuous Wave (CW) Doppler radar system with leakage cancellation comprising:
   a) an antenna for transmitting and receiving signals;
   b) an antenna interface in electrical communication with the antenna, the antenna interface having an input for receiving a plurality of transmit signals, each transmit signal having a different frequency, and an output for outputting a plurality of return signals, each return signal having a received signal component from the antenna and a leakage signal component leaked through the interface from the transmit signal associated with the received signal;
   c) an intermediate frequency (IF) mixer for mixing each of the plurality of return signals with a common reference signal to generate a plurality of IF return signals;
   d) an adder for receiving the plurality of IF return signals and a plurality of leakage cancellation signals and for generating an adder output signal therefrom;
   e) a plurality of cancellation loops in electrical communication with the adder for generating a plurality of associated leakage cancellation signals for each individual transmit signal, each of the plurality of cancellation loops comprising:
      1) a reference signal mixer for mixing the common reference signal with one of the transmit signals to generate an associated mixed reference signal therefrom,
      2) a first cancellation mixer for mixing one of the IF return signals with the associated mixed reference signal to generate an associated mixed IF return signal therefrom;
      3) a linear feedback cancellation circuit for generating an associated mixed leakage cancellation signal from the associated mixed IF return signal, the feedback cancellation circuit being operative to generate a filtering notch with a notch bandwidth of less than 1 Hertz and a notch depth of over 40 dB at the frequency of the associated mixed IF return signal;
      4) a second cancellation mixer for mixing the associated mixed leakage cancellation signal with the associated mixed reference signal to generate an unmixed leakage cancellation signal therefrom; and
   f) the adder being operative to sum the plurality of IF return signals with a plurality of leakage cancellation signals and to output a plurality of filtered return signals, each filtered return signal being characterized by the absence of an associated leakage component.

2. The CW Doppler radar system of claim 1, further comprising a local oscillator to generate a local oscillator signal, and a single sideband generator being operative to mix the reference signal with the local oscillator signal.

3. The CW Doppler radar system of claim 2 further comprising an up-converter to mix the local oscillator signal with the plurality of transmit signals.

4. The CW Doppler radar system of claim 3 further comprising an amplifier disposed between the adder and the first cancellation mixer.

5. The CW Doppler radar system of claim 4, wherein for each transmit signal, a pair of cancellation loops are coupled with a first loop having an in-phase cancellation circuit, and a second loop having a quadrature-phase cancellation circuit.

6. The CW Doppler radar system of claim 5 wherein each loop of the paired cancellation loops includes a phase compensation circuit coupled the first cancellation mixer.

7. A method of canceling leakage in a CW Doppler radar system comprising the steps of:
   (a) transmitting a plurality of transmit signals;
   (b) receiving a plurality of return signals each having a received signal component from the antenna and a leakage signal component from an associated transmit signal;
   (c) mixing the plurality of return signals with a reference signal, to generate a plurality of IF return signals;
   (d) mixing the reference signal with a plurality of associated transmit signals to form a plurality of mixed reference signals;
   (e) mixing the plurality of IF return signals with the plurality of associated mixed reference signals to generate a plurality of mixed IF return signals;
   (f) correlating the plurality of mixed IF return signals to generate a plurality of associated mixed leakage cancellation signals;
   (g) mixing the plurality of mixed leakage cancellation signals with the plurality of associated mixed reference signals to generate a plurality of unmixed leakage cancellation signals;
   (h) summing the plurality of leakage cancellation signals to generate a feed-back signal representative of the plurality of leakage cancellation signals; and
   (i) subtracting the feed-back signal from the plurality of IF return signals to generate a received signal.

8. The method of claim 7, wherein step (c) further includes the step of amplifying the IF signal.

9. The method of claim 8 wherein step (c) includes the step of splitting the plurality of IF return signals into an in-phase IF return signal and a quadrature-phase IF return signal for each transmit signal;
   step (e) further includes the step of mixing the in-phase IF return signal with an associated in-phase reference signal and mixing the quadrature-phase IF return signal with an associated quadrature-phase reference signal;
   step (f) further includes the step of correlating the mixed in-phase IF return signal to form an associated mixed in-phase leakage cancellation signal and correlating the mixed quadrature-phase IF return signal to form an associated mixed quadrature-phase leakage cancellation signal; and step (g) further incudes the step of mixing the in-phase leakage cancellation signal and mixing the quadrature-phase leakage cancellation signal.

10. The method of claim 9 wherein the plurality of transmit signals are mixed with a signal from a local oscillator.

11. The method of claim 10 wherein step (c) further includes mixing the reference signal with the local oscillator signal.

\* \* \* \* \*